March 24, 1970  K. MÜLLER  3,502,208
AUTOMATIC GEAR TESTING DEVICE

Filed Jan. 22, 1968  2 Sheets-Sheet 1

INVENTOR
KARL MULLER

INVENTOR
KARL MÜLLER 3,502,208
AUTOMATIC GEAR TESTING DEVICE
Karl Müller, Zurich, Switzerland, assignor to Maag Gear Wheel & Machine Company Limited, Zurich, Switzerland
Filed Jan. 22, 1968, Ser. No. 699,599
Claims priority, application Germany, Jan. 20, 1967, M 72,487
Int. Cl. B07c 5/34
U.S. Cl. 209—73         7 Claims

ABSTRACT OF THE DISCLOSURE

In an automatic gear testing device, the master toothed piece comprises a rack having a length substantially corresponding to the circumference of the gears to be tested. This rack is movable, perpendicularly to its length, and radially of the test gear, through a distance which is only of the approximate order of magnitude of the relatively small measuring and testing movements of a measuring head and control device. A slide is displaceable longitudinally of the rack and provided with centering means for rotatably receiving a gear to be tested, the gear being rotated in mesh with the rack during descent of the slide. Cams on the slide operate limit switches to release the centering device at the lower limit of movement of the slide to drop the gear to roll along a discharge path where the gears are sorted as to oversize, undersize and within predetermined tolerances.

BACKGROUND OF THE INVENTION

Testing and/or measuring of continuously produced gears may be effected by meshing each of the gears with a master serration to determine the total composite (double flank) error, with the gears being sorted as to undersize, oversize and "pass."

The total composite error $F''_i$ is ascertained by meshing the gear to be tested, without play, with a gauging gear or gauging rack, the criterion being the variations in distance between axes. The recorded variations or deflections represent the accumulative influences of the various serration errors. The total composite error $F''_i$ equals the difference between the greatest distance and the smallest distance between axes during one full revolution of the test gear about its axis.

In a known testing and sorting device for gears, the workpieces or gears to be tested intermesh with the master gear and are sorted automatically according to the test finding, being conducted to corresponding guide troughs in accordance with whether the gear is acceptable, is undersized, or is oversized. The master gear is rotatable opposite the axis of the workpiece or test gear, as well as being displaceable at right angles relative to the test gear in such a manner that, by at least one of these movements, electric contacts are actuated which open or close the registers to the guide troughs. Although master gears are very accurate, they do not match the precision of a rack which consists exclusively of plane faces which can be machined with utmost accuracy.

Another automatic gear testing device for measuring total composite errors utilizes, as a measuring feeler, a rack mounted easily displaceable tangentially of the test gear in an auxiliary slide which has limited movability radially of the test gear on a slide moving back and forth through at least the height of the serrations or teeth, and which is spring biased against the test piece. In this device, one tooth of the test piece always meshes with the rack, whereupon the slide is moved backwardly pulling the rack into its initial position in order to engage with the next tooth of the test piece when the slide again moves forwardly. The rack is therefore relatively short, and the device cannot be used for sorting of the tested gears.

SUMMARY OF THE INVENTION

This invention relates to devices for testing and sorting continuously produced gears and, more particularly, to such a device which has the highest precision, has a simple and sturdy construction, and is suitable for use under shop conditions.

In accordance with the invention, an automatic gear tester is provided using, as a master serration, a rack having a length substantially corresponding to the circumference of gears to be tested. This rack is movable radially of the gear to be tested through a distance only of the approximate order of magnitude of the relatively small measuring and testing movements of the measuring and control device. A centering device to receive the gear to be tested is mounted on a slide which is displaceable on guides parallel to the length of the rack.

An object of the invention is to provide an improved automatic device for testing continuously produced gears.

Another object of the invention is to provide such a device which sorts gears according to undersize, oversize, or acceptable.

A further object of the invention is to provide an automatic gear testing and sorting device utilizing, as a master serration, a rack having a length substantially corresponding to the circumference of the gears to be tested.

Yet another object of the invention is to provide such an automatic gear testing and sorting device in which the rack is movable, radially of the gear to be tested, through a distance which is only the approximate order of magnitude of the relatively small measuring and testing movements.

A further object of the invention is to provide such a device including a centering device for receiving the gears and mounted on a slide displaceable on guide parallel to the length of the rack.

Still another object of the invention is to provide such an automatic gear testing and sorting device in which the centering device is actuable by an electromagnet automatically energized responsive to the slide reaching one end of its movement.

A further object of the invention is to provide such an automatic gear testing and sorting device which has the highest precision and a simple and sturdy consrtuction, and which is suitable for use under shop conditions.

BRIEF DESCRIPTION OF THE DRAWINGS

For an understanding of the principles of the present invention, reference is made to the following description of a typical embodiment thereof as illustrated in the accompanying drawings.

In the drawings.

DESCRIPTION OF THE PREFERRED EMBODIMENT

Figure 1:
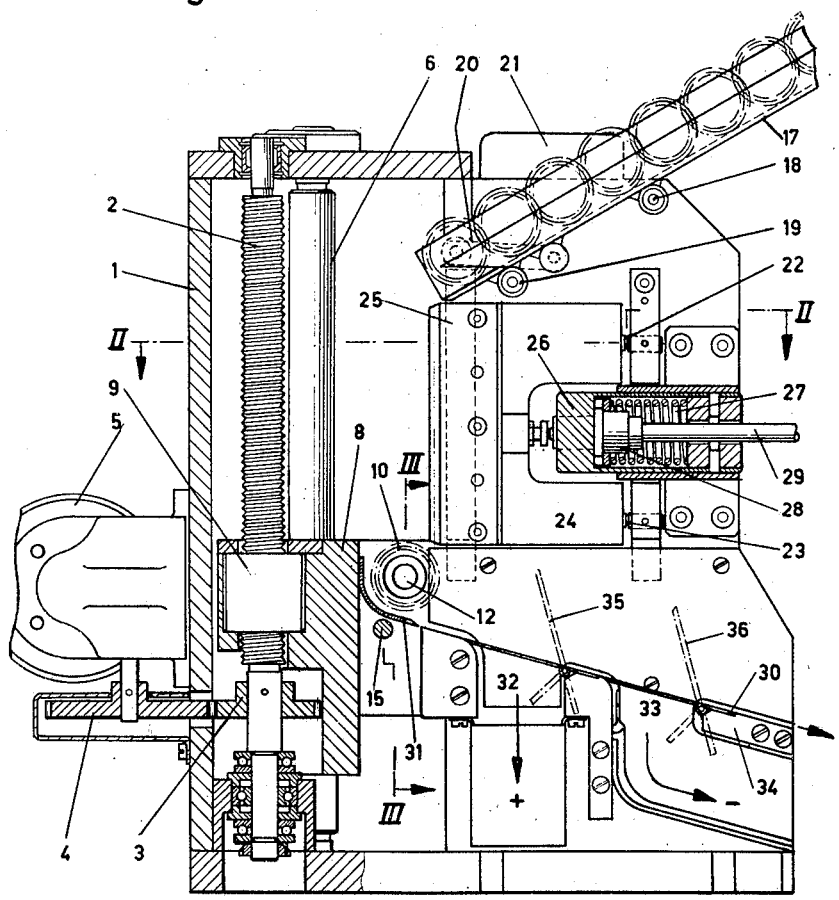
FIG. 1 is a vertical sectional view of a gear testing and sorting device embodying the invention, taken along the line I—I of FIG. 2.

Referring to the drawings, the automatic gear tester of the invention is installed in a housing 1 comprising a base plate, side walls and a cover plate. A vertically extending threaded spindle 2 is rotatably mounted in housing 1 and has secured thereto a gear 3 meshing with a gear 4 driven by a motor 5 mounted on housing 1. Two guide rods 6 and 7 extend parallel to spindle 2 and are mounted in housing 1. A slide 8 is guided on guide rods 6 and 7 and has secured therein a spindle nut 9 which is fixed against rotation and threadly engaged with spindle 2.

Figure 2:
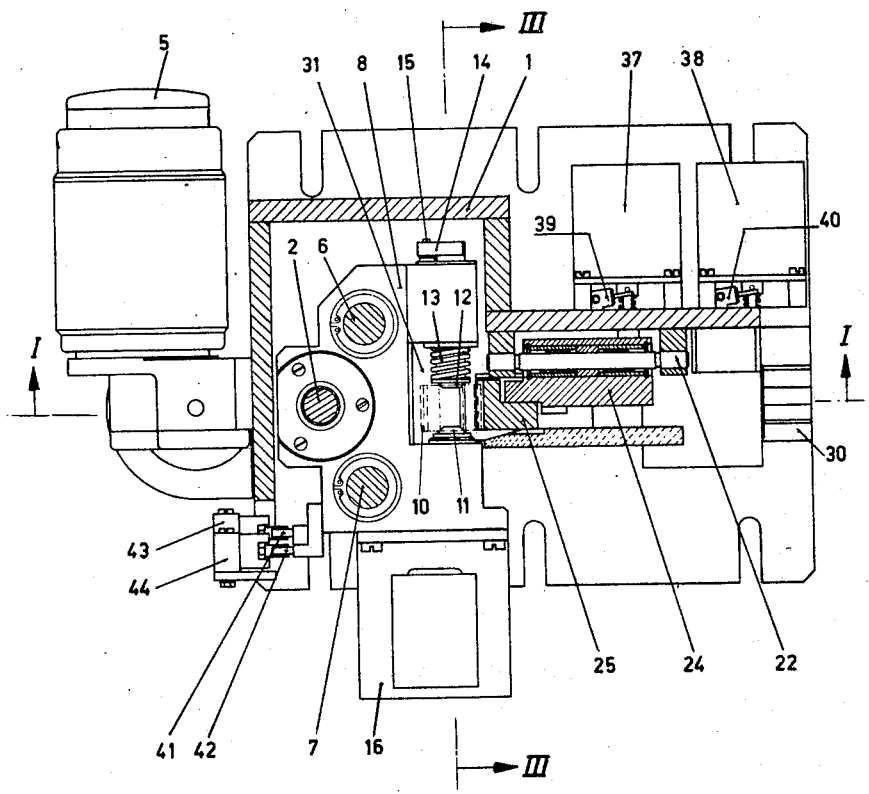
FIG. 2 is a horizontal sectional view taken along the line II—II of FIG. 1.
Figure 3:
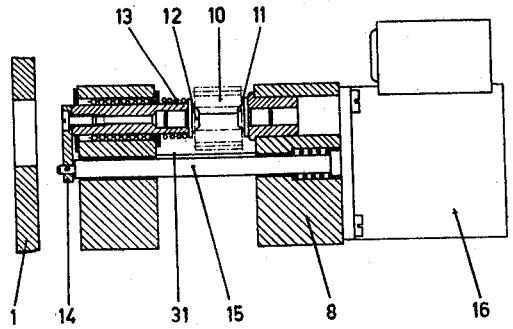
FIG. 3 is a sectional view taken along the lines III—III of FIGS. 1 and 2.

Slide 9 has arranged thereon a centering device for the gear 10 to be tested, as shown more particularly in FIGS. 2 and 3. The centering device comprises a fixed centering spike or spindle 11 and an axially movable centering spike or spindle 12 which is biased by a compression spring 13 to retain a test gear or workpiece 10. A bridge piece 14 connects the axially movable centering spike or spindle 12 rigidly with an actuating rod 15 fixedly connected with the armature of an electromagnet 16. The rod 15, under the control of electromagnet 16, serves to clamp and unclamp test pieces 10 through the centering spikes or spindles 11 and 12. Slide 8 carries cams 41 and 42 actuating respective limit switches 43 and 44 for controlling electromagnet 16. These switches and their actuating cams are shown more particularly in FIG. 2, and the two switches are at respective spaced locations along the path of travel of slide 8.

A work-feed track 17 is secured to housing 1 by bolts 18 and 19, as best seen in FIG. 1. The lowermost of the workpieces 10 present in track 17 is held in position by a linkage 20 operated by an electromagnet 21 to release the lowermost workpiece. Below track 17, horizontal guide rods 22 and 23 are mounted in fish plates secured on one lateral wall of housing 1. These guide rods 22 and 23 guide a measuring slide 24 which is movable horizontally and radially of the test gear. A vertically oriented rack 25 is secured to slide 24 and is designed as a gauging or master rack. Rack 25 has a length somewhat in excess of the circumference of the workpiece or gear 10 to be tested.

In another bracket mounted on the lateral wall 1 of housing 1, there is mounted a measuring head holder 26 in which is mounted the measuring head 28 held in position in holder 26 by a compression spring 27. The pressure bolt of measuring head 28 presses against measuring slide 24, as best seen in FIG. 1, and thus biases rack 25 horizontally, or radially relative to the workpiece, into meshing engagement with the workpiece. Measuring head 28 transmits the measured results to an electronic measuring device, not shown, through a cable 29, and the measuring device is provided with an indicating or recording means.

In housing 1, below rack 25, there is a guide trough 30 for removal of the tested workpieces. A catch plate 31 is fastened to slide 8 and conducts the workpieces into guide trough 30, which latter has openings 32 and 33, in its bottom wall, and a terminal discharge portion 34. Pivotal covers 35 and 36 are operatively associated with openings 32 and 33 to open and close the same. Opening 32 is opened for oversized gears, opening 33 for undersized gears, and terminal discharge portion conducts gears which pass inspection. The covers 35 and 36 are actuated by respective electromagnets 37 and 38 through respective linkages 39 and 40.

A testing cycle of the gear tester proceeds in the following manner. Through energization of electromagnet 21, a gear 10 to be tested is released from the work-feed track 17 filled with workpieces to be tested. This gear falls between the centering spikes or spindles 11 and 12 on slide 8, which is in its highest position when the testing cycle is initiated. In this position, gear 10 is in mesh with rack 25. Electromagnet 16 is then deenergized, through operation of switch 44 by cam 42, and compression spring 13 engages with movable centering spike or spindle 12 is released to bias centering spike or spindle 12 to press gear 10 against fixed centering spike or spindle 11, thus centering the test gear in position.

At the same time, and by means of linkage 20 operated by electromagnet 21, the next following gear moving along track 17 is arrested at the lower end of this track.

Motor 5 for operating slide 8 is then energized and, through gears 4 and 3, threaded spindle 2 and nut 9, slide 8 is moved downwardly and thus gear 10 is guided along and parallel with rack 25. During this movement, rack 25 is pushed radially of gear 10 by spring 27 associated with measuring head 28 to engage workpiece 10 with a gentle pressure. By means of the electronic measuring device, and in dependence on the measuring position of rack 25, referred to the radial distance of rack 25 from the axis of test gear 10, the respective signals are stored. At the end of the measuring operation, when the parts have the position shown in FIG. 1, electromagnet 16 is energized by an operation of switch 43 by cam 41 to release the workpiece from the centering device. If the test gear is too large, cover 35 is opened by electromagnet 37 through linkage 39 so that, after energization of magnet 16, the workpiece falls through opening 32. If the workpiece 10 is too small, then cover 36 is opened by electromagnet 38 through linkage 40, and the workpiece is sorted with the undersized gears by dropping through opening 33. If rack 25 indicates a deflection within the acceptable tolerances of the test gears, that is, within the permissible tolerance range for total composite (double flank) errors, neither of the magnets 37 or 38 is actuated and workpiece 10 is conducted to those gears which have passed inspection and through the terminal discharge portion 34.

Using the automatic gear testing and sorting device of the invention, a very high measuring frequency is possible at low cost.

What is claimed is:

1. In an automatic gear testing device for testing or measuring the total composite (double flank) error of continuously produced gears by meshing the gears to be tested with a master serration, and including a measuring and control device movable to measure the error and a sorting device controlled by the measured error and sorting the tested gears as to undersize, oversize and approved: the improvement comprising, in combination, a substantially rectilinear rack forming said master serration and having a length corresponding substantially to the circumference of the gears to be tested; means mounting said rack for movement perpendicular to its length and radially of a gear to be tested only through a distance having the approximate order of magnitude or the relatively small measuring and testing movements of said measuring and control device; and gear transport means movable parallel to the length of said rack to receive and transport a gear along said rack in rotating meshing engagement therewith.

2. In an automatic gear testing device, the improvement claimed in claim 1, in which said gear transport means includes guides extending parallel to said rack and a slide displaceable longitudinally of said guides.

3. In an automatic gear testing device, the improvement claimed in claim 2, in which said gear transport means further includes centering means on said slide operable to engage and support gear to be tested for rotation about its axis in meshing engagement with said rack.

4. In an automatic gear testing device, the improvement claimed in claim 3, in which said gear transport means further includes means operable automatically to displace said slide along said guides.

5. In an automatic gear testing device, the improvement claimed in claim 3, wherein said centering means comprises a pair of coaxial and axially relatively displaceable spindles and operating means connected to at least one of said spindles and operable to effect separation of said spindles to receive a gear to be tested, to move said spindles toward each other to retain the gear to be tested and to again separate said spindles to release a gear after testing.

6. In an automatic gear testing device, the improvement claimed in claim 5, in which said operating means includes an electromagnet and means mechanically connecting the movable armature of the electromagnet to one of said spindles.

7. In an automatic gear testing device, the improvement claimed in claim 6, in which said gear transport means further includes a pair of limit switches each adjacent a respective end of the path of movement of said slide and connected in controlling relation with said electromagnet, and cams on said slide each engageable with a respective limit switch at a respective limit of movement of said slide, operation of one of said limit switches by the associated cam effecting separation of said spindles and operation of the other limit switch by the associated cam effecting movement of said spindles toward each other to rotatably support a gear to be tested.

References Cited

UNITED STATES PATENTS

| | | | |
|---|---|---|---|
| 2,761,560 | 9/1956 | Pomernacki | 209—88 |
| 3,099,882 | 8/1963 | Gates | 209—88 X |
| 3,313,411 | 4/1967 | Fabish | 209—80 |

ALLEN N. KNOWLES, Primary Examiner

U.S. Cl. X.R.

209—80